United States Patent
Schmidt et al.

(10) Patent No.: US 11,872,966 B2
(45) Date of Patent: Jan. 16, 2024

(54) ELECTROMECHANICAL OR ELECTROMAGNETIC WHEEL BRAKE CYLINDER AND PRODUCTION METHOD FOR THE SAME, BRAKE SYSTEM FOR A VEHICLE, AND METHOD FOR AUTONOMOUS BRAKING OF A VEHICLE

(71) Applicant: Robert Bosch GmbH, Stuttgart (DE)

(72) Inventors: Thomas Schmidt, Bietigheim-Bissingen (DE); Dieter Blattert, Kirchheim/Neckar (DE); Julian Ewald, Stuttgart (DE)

(73) Assignee: ROBE IT BOSCH GMBH, Stuttgart (DE)

( * ) Notice: Subject to any disclaimer, the term of this patent is extended or adjusted under 35 U.S.C. 154(b) by 732 days.

(21) Appl. No.: 17/047,850

(22) PCT Filed: Mar. 7, 2019

(86) PCT No.: PCT/EP2019/055689
§ 371 (c)(1),
(2) Date: Oct. 15, 2020

(87) PCT Pub. No.: WO2019/206506
PCT Pub. Date: Oct. 31, 2019

(65) Prior Publication Data
US 2021/0162976 A1 Jun. 3, 2021

(30) Foreign Application Priority Data

Apr. 27, 2018 (DE) .......................... 102018206563.2

(51) Int. Cl.
*B60T 13/74* (2006.01)
*G05D 1/00* (2006.01)
*B60T 13/66* (2006.01)

(52) U.S. Cl.
CPC .......... *B60T 13/745* (2013.01); *G05D 1/0088* (2013.01); *B60T 13/662* (2013.01);
(Continued)

(58) Field of Classification Search
CPC .... B60T 13/745; B60T 13/662; B60T 13/741; B60T 2270/82; G05D 1/0088; B60Y 2400/81
See application file for complete search history.

(56) References Cited

U.S. PATENT DOCUMENTS

| 10,744,967 B2* | 8/2020 | Lee ........................ B60W 30/06 |
| 2007/0007817 A1* | 1/2007 | Nonaga ................. B60T 13/746 303/155 |

(Continued)

FOREIGN PATENT DOCUMENTS

| CN | 103003115 A | 3/2013 |
| CN | 103144620 A | 6/2013 |

(Continued)

OTHER PUBLICATIONS

International Search Report for PCT/EP2019/055689, dated May 17, 2019.

*Primary Examiner* — Ramsey Refai
(74) *Attorney, Agent, or Firm* — NORTON ROSE FULBRIGHT US LLP; Gerard A. Messina (57) ABSTRACT

An electromechanical or electromagnetic wheel brake cylinder for a braking system, embodied with at least one hydraulic braking circuit, of a vehicle, including a pressure chamber that is embodied in the electromechanical or electromagnetic wheel brake cylinder and is delimited by a displaceable first brake piston of the electromechanical or electromagnetic wheel brake cylinder, and is linkable to a sub-volume of the at least one hydraulic braking circuit of the braking system in such a way that the first brake piston is displaceable by way of a pressure that is increased at least (Continued)

in in the respective sub-volume. The electromechanical or electromagnetic wheel brake cylinder encompasses an electromechanical or electromagnetic actuator and a second brake piston which is displaceable by operation of the electromechanical or electromagnetic actuator.

11 Claims, 3 Drawing Sheets

(52) U.S. Cl.
CPC ......... *B60T 13/741* (2013.01); *B60T 2270/82* (2013.01); *B60Y 2400/81* (2013.01)

(56) References Cited

U.S. PATENT DOCUMENTS

| | | |
|---|---|---|
| 2008/0189019 A1 | 8/2008 | Attayebi et al. |
| 2016/0264113 A1 | 9/2016 | Feigel |
| 2016/0297415 A1* | 10/2016 | Kato .................. F02D 41/065 |
| 2016/0339888 A1* | 11/2016 | Yokoyama ............. F16D 65/18 |
| 2017/0137008 A1 | 5/2017 | Takase et al. |

FOREIGN PATENT DOCUMENTS

| | | |
|---|---|---|
| CN | 103534154 A | 1/2014 |
| CN | 104071141 A | 10/2014 |
| DE | 102004015447 A1 | 12/2004 |
| DE | 102012023341 A1 | 6/2013 |
| DE | 102013209006 A1 | 11/2014 |
| DE | 102014225962 A1 | 6/2016 |

* cited by examiner

ELECTROMECHANICAL OR ELECTROMAGNETIC WHEEL BRAKE CYLINDER AND PRODUCTION METHOD FOR THE SAME, BRAKE SYSTEM FOR A VEHICLE, AND METHOD FOR AUTONOMOUS BRAKING OF A VEHICLE

FIELD

The present invention relates to an electromechanical or electromagnetic wheel brake cylinder for a braking system, embodied with at least one hydraulic braking circuit, of a vehicle; and to braking systems for vehicles. The present invention also relates to a manufacturing method for an electromechanical or electromagnetic wheel brake cylinder for a braking system, embodied with at least one hydraulic braking circuit, of a vehicle. The present invention further relates to methods for autonomous braking of a vehicle.

BACKGROUND INFORMATION

German Patent Application No. DE 10 2013 209 006 A1 describes a control apparatus for a brake-boosted autonomous braking system of a vehicle, and a corresponding method for operating a brake-boosted autonomous braking system of a vehicle. By operation of the control apparatus, or by execution of the corresponding method, it is said to be possible for autonomous braking pressure buildup to be brought about in at least one of its hydraulic wheel brake cylinders using an active brake booster and/or at least one pump of the respective braking system.

SUMMARY

The present invention provides an electromechanical or electromagnetic wheel brake cylinder for a braking system, embodied with at least one hydraulic braking circuit, of a vehicle, braking systems for a vehicle, a manufacturing method for an electromechanical or electromagnetic wheel brake cylinder for a braking system, embodied with at least one hydraulic braking circuit, of a vehicle, and methods for autonomous braking of a vehicle.

The present invention provides capabilities for autonomous braking of a vehicle with (complete) functional redundancy. "(Complete) functional redundancy" is to be understood to mean that even in the context of a significant functional impairment of at least one braking-system component of the braking system being used, the respective vehicle can still be autonomously braked without difficulty because of guaranteed availability of a "substitute braking system component." Active intervention by a driver of the respective vehicle in order to circumvent the at least one functionally impaired braking system component is not necessary when the present invention is utilized. The present invention thus contributes to enhancing a convenience and a safety standard of fully automated (fully autonomous) driving functions.

The present invention provides, in particular, braking systems that, on the basis of a (complete) functional redundancy, advantageously meet future requirements for fully automated (fully autonomous) driving functions. In particular, each vehicle equipped with a braking system according to the present invention can still be braked without active participation by the driver (i.e., autonomously or fully automatically), even in the context of a complete failure of its hydraulic braking system components. This can be used both for a short-term circumvention function or "fail operation" (lasting approximately two minutes) and for a long-term circumvention operation (lasting up to several hours). "Autonomous braking" of the vehicle can be understood both as autonomous deceleration of the vehicle and as autonomously bringing the vehicle to a standstill (or autonomously keeping the vehicle at a standstill). Because of the (complete) functional redundancy of the braking system, even a complete failure of all hydraulic braking system components of the braking system can be circumvented with no need for the driver to intervene in order to assist.

Each braking system according to the present invention can be still be used to execute fully automatic (fully autonomous) driving functions even in the event of leakage in its hydraulic braking system components. In particular, the vehicle equipped with the respective braking system can still be braked, despite the leakage, even without intervention by the driver (i.e., autonomously or automatically). The vehicle equipped with the respective braking system is thus outstandingly suitable for autonomous or semiautonomous (automated or semiautomated) "driverless driving."

In an advantageous embodiment of the braking systems, the braking system encompasses at least one control apparatus that is respectively embodied in such a way that the at least one control apparatus is operable at least temporarily in an autonomous braking mode in which at least the motorized brake pressure buildup apparatus, the at least one electromechanical and/or electromagnetic individual-wheel brake, and/or the respective electromechanical or electromagnetic actuator of the at least one electromechanical and/or electromagnetic wheel brake cylinder can have control applied to them, by way of the at least one control apparatus, in such a way that the vehicle is autonomously brakable by operation of the motorized brake pressure buildup apparatus and/or by operation of the at least one electromechanical and/or electromagnetic individual-wheel brake and/or of the at least one electromechanical and/or electromagnetic actuator. The at least one control apparatus can thus implement (complete) functional redundancy for automated or autonomous driving (while avoiding dynamic redundancy).

As an advantageous refinement of the present invention, the at least one control apparatus present in the autonomous braking mode can be embodied to autonomously brake the vehicle primarily by operation of the at least one electromechanical and/or electromagnetic individual-wheel brake and/or of the at least one electromechanical and/or electromagnetic actuator, and to utilize the motorized brake pressure buildup apparatus for autonomous braking of the vehicle only when a functional impairment of the at least one electromechanical and/or electromagnetic individual-wheel brake and/or of the at least one electromechanical and/or electromagnetic actuator is ascertained, and/or if a currently maximally producible total braking performance of the at least one electromechanical and/or electromagnetic individual-wheel brake and of the at least one electromechanical and/or electromagnetic actuator is not sufficient for autonomous braking of the vehicle within a predefined travel distance and/or within a predefined time interval. The at least one electromechanical and/or electromagnetic individual-wheel brake and/or the at least one electromechanical and/or electromagnetic actuator can thus be used a primary actuator system (master actuator system) for autonomous braking of the vehicle. Operation of the at least one electromechanical and/or electromagnetic individual-wheel brake and/or of the at least one electromechanical and/or electromagnetic actuator can additionally be used for converting kinetic energy of the vehicle to be braked into electrical energy. The motorized brake pressure buildup apparatus, constituting a secondary actuator system (slave actuator system), serves to take over from or supplement the primary actuator system in a "fault situation" or in an "extreme situation." The motorized brake pressure buildup apparatus (having the hydraulic braking system components interacting therewith) thus implements an "autonomous fallback level" that makes it unnecessary for the driver of the vehicle to intervene in order to circumvent functions that can no longer be executed by way of the primary actuator system.

For example, the braking system can have a brake master cylinder which is linked to the at least one braking circuit and in which a pressure increase is producible by actuation, by a driver of the vehicle, of a brake actuation element linked to the brake master cylinder. In this situation the driver can still bring the vehicle to a standstill (and, if applicable, keep it at a standstill) by way of his or her braking force even in the event of a complete failure of all electrical components of the braking system (for example, due to a failure of an electrical system of the vehicle). The motorized brake pressure buildup apparatus can furthermore be an electromechanical brake booster preceding the brake master cylinder. An electromechanical brake booster that is often already installed in vehicles (for instance, an iBooster, an eBooster, an electronic booster, an eBKV, an electronic brake booster) can thus be used to implement the embodiment of the braking system which is described here. This reduces the costs involved in implementing the embodiment.

An example manufacturing method in accordance with the present invention for an electromechanical or electromagnetic wheel brake cylinder for a braking system, embodied with at least one hydraulic braking circuit, of a vehicle also allows the above-described advantageous braking systems to be obtained.

The corresponding example methods for autonomous braking of a vehicle in accordance with the present invention also provide the advantages described above. It is expressly noted that the methods for autonomous braking of a vehicle can be refined in accordance with the embodiments of braking systems which are explained above.

BRIEF DESCRIPTION OF THE DRAWINGS

Further features and advantages of the present invention are explained below with reference to the Figures.

DETAILED DESCRIPTION OF EXAMPLE EMBODIMENTS

Figure 1:
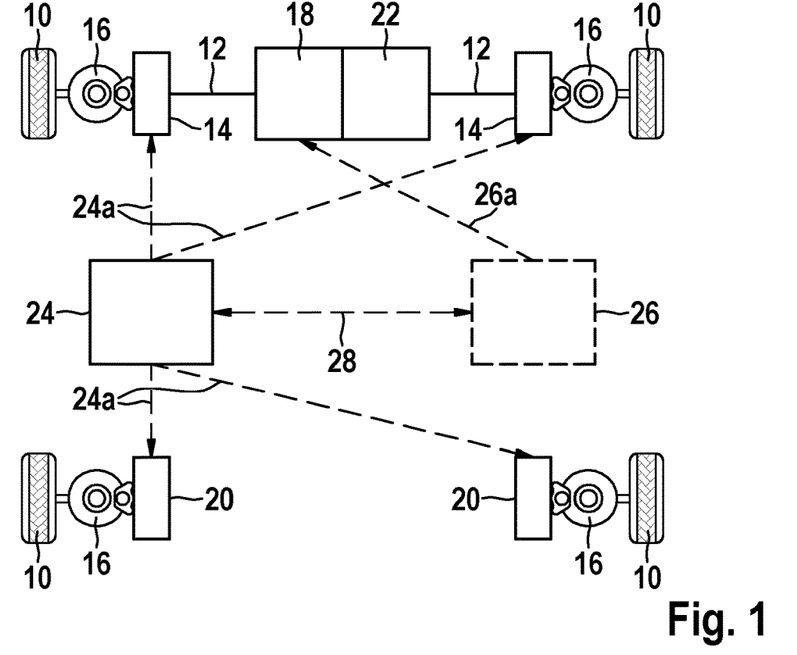
FIG. 1 schematically depicts an example embodiment of a braking system according to the present invention.

FIG. 1 schematically depicts an example embodiment of a braking system according to the present invention.

The braking system schematically depicted in FIG. 1 is installable or installed on a vehicle or motor vehicle, all that is schematically depicted of the vehicle or motor vehicle being its wheels 10. Be it noted that a usability of the braking system type explained hereinafter is not limited to the schematically reproduced vehicle or motor vehicle having exactly four wheels 10. The usability of this braking system type is also not limited to any specific type of vehicle or motor vehicle.

The braking system encompasses at least one hydraulic braking circuit 12. Although the braking system of FIG. 1 has only a single braking circuit 12, in a refinement it can also have two or more than two braking circuits 12. The braking system furthermore encompasses at least one electromechanical or electromagnetic wheel brake cylinder 14, which is respectively associated with a wheel 10 of the vehicle and is respectively linked to a sub-volume of the at least one hydraulic braking circuit 12. As an optional supplement, the at least one braking circuit 12 can also encompass at least one further braking system component, for example at least one electrically switchable valve, at least one non-return valve, at least one overpressure valve, at least one reservoir chamber, and/or at least one pressure sensor.

Embodied in each electromechanical or electromagnetic wheel brake cylinder 14 is a pressure chamber that is delimited by a displaceable first brake piston of electromechanical or electromagnetic wheel brake cylinder 14. The respective pressure chamber of the at least one electromechanical and/or electromagnetic wheel brake cylinder 14 of the braking system is furthermore linkable or linked to the at least one sub-volume of the at least one hydraulic braking circuit 12 in such a way that the first brake piston (which delimits the respective pressure chamber) is displaceable or becomes displaced by way of a pressure that is increased in the respective sub-volume. In particular, the respective first brake piston of the at least one electromechanical and/or electromagnetic wheel brake cylinder 14 can be pressed, by way of the pressure increase at least in the respective sub-volume, against a brake disk 16 of wheel 10 associated with it, in such a way that a first (non-zero) braking torque counteracts a rotation of the associated wheel 10.

The at least one electromechanical and/or electromagnetic wheel brake cylinder 14 of the braking system also has a respective electromechanical or electromagnetic actuator with which a second brake piston of the respective electromechanical or electromagnetic wheel brake cylinder 14 is associated. The respective second brake piston is or becomes displaceable or displaced by operation of the electromechanical or electromagnetic actuator. In particular, the respective second brake piston can be pressed, by operation of the (associated) electromechanical or electromagnetic actuator, against brake disk 16 of the associated wheel 10 in such a way that a second (non-zero) braking torque counteracts the rotation of the associated wheel 10 alternatively or in addition to the first braking torque.

The at least one electromechanical or electromagnetic wheel brake cylinder 14 of the braking system is thus suitable both for "hydraulic braking" of the rotation of the associated wheel 10 by way of the first (non-zero) braking torque, and for "electromechanical or electromagnetic braking" of the rotation of the associated wheel 10 by way of the second (non-zero) braking torque. Preferably, each electromechanical and/or electromagnetic wheel brake cylinder 14 has a dedicated housing in which both its first brake piston and its second brake piston are displaceably disposed. An embodiment of the respective housing in which the electromechanical or electromagnetic actuator is also at least partly embodied in the associated housing is preferred. Good interaction between the first brake piston and the second brake piston interacting therewith is also achievable when the first brake piston and the second brake piston interacting therewith are disposed displaceably in a shared brake caliper of the respective electromechanical or electromagnetic wheel brake cylinder 14.

The braking system of FIG. 1 also has a motorized brake pressure buildup apparatus 18 which is embodied in such a way that by operation of motorized brake pressure buildup apparatus 18, at least a pressure respectively present in the at least one sub-volume of the at least one hydraulic braking circuit 12 to which the at least one electromechanical or electromagnetic wheel brake cylinder 14 is linked is increasable or becomes increased. Motorized brake pressure buildup apparatus 18 can thus be used for autonomous (automated) displacement or pressing of the at least one first brake piston of the at least one electromechanical and/or electromagnetic wheel brake cylinder 14 against the at least one associated brake disk 16. Advantageous examples of motorized brake pressure buildup apparatus 18 will be discussed in further detail below.

The braking system of FIG. 1 has, for each respective wheel 10 of the vehicle, the at least one electromechanical and/or electromagnetic wheel brake cylinder 14 and/or one electromechanical and/or electromagnetic individual-wheel brake 20. Each wheel 10 of the vehicle thus has associated with it either its electromechanical or electromagnetic wheel brake cylinder 14, or its electromechanical and/or electromagnetic individual-wheel brake 20. The "at least one electromechanical and/or electromagnetic individual-wheel brake 20" is to be understood as a respective friction brake whose brake piston is pressable or becomes pressed, by way of an electromechanical or electromagnetic actuator of the respective electromechanical or electromagnetic individual-wheel brake 20, against brake disk 16 of the associated wheel 10 in such a way that a (non-zero) braking torque counteracts the rotation of the associated wheel 10. Merely by way of example, in the braking system of FIG. 1 only one vehicle axle of the vehicle, for instance a front axle of the vehicle, has two electromechanical and/or electromagnetic wheel brake cylinders 14 associated with it, while the at least one other vehicle axle is fitted with two electromechanical and/or electromagnetic individual-wheel brakes 20. Be it noted, however, that in the context of the braking system described here, each wheel 10 of the vehicle can also have exactly one electromechanical or electromagnetic wheel brake cylinder 14 associated with it.

The braking system of FIG. 1 thus encompasses an "autonomous hydraulic braking system" (realized by way of the at least one first brake piston, displaceable by way of motorized brake pressure buildup apparatus 18, of the at least one electromechanical and/or electromagnetic wheel brake cylinder 14) and an "autonomous electromechanical and/or electromagnetic braking system" (realized by way of the at least one second brake piston, displaceable by its actuator, of the at least one electromechanical and/or electromagnetic wheel brake cylinder 14 and possibly the at least one brake piston of the at least one electromechanical and/or electromagnetic individual-wheel brake 20). Both the "autonomous hydraulic braking system" and the "autonomous electromechanical and/or electromagnetic braking system" are (together or alone) suitable for (individual-wheel) autonomous braking of the rotation of the respectively associated wheel 10 (possibly with modulation of the respectively exerted braking torque). For autonomous (automated) braking of the vehicle equipped with the braking system of FIG. 1, it is thus possible, in situation-dependent fashion, to use selectably only the "autonomous hydraulic braking system," only the "autonomous electromechanical and/or electromagnetic braking system," or an overall braking system made up of the "autonomous braking system" and the "autonomous electromechanical and/or electromagnetic braking system." The braking system is thus advantageously suitable for highly autonomous (highly automated) applications, for instance an ABS function (or an ESP function), driver assistance systems for semiautonomous or fully autonomous (semiautomated or fully automated) driving of the vehicle, and emergency braking functions for autonomous (automated) braking of the vehicle to a standstill (and possible for autonomously (automatically) keeping the vehicle at a standstill).

An advantage of the braking system of FIG. 1 is furthermore a (complete) functional redundancy of the braking system which, even in the event of a complete failure of one of the two autonomous braking systems, nevertheless makes it possible to continue or to (completely) execute a highly autonomous (highly automated) application by way of the other of the two autonomous braking systems. The two autonomous braking systems thus realize a (complete) functional redundancy that enables autonomous (automated) driving even in the event of a failure of one of the two autonomous braking systems. For example, semiautonomous or fully autonomous (automated or semiautomated) driving of the vehicle can still be continued, despite complete failure of one of the two autonomous braking systems, by continued driving of the vehicle brought about by way of the other of the two autonomous braking systems. The two autonomous braking systems thus realize the advantage of (complete) functional redundancy so reliably that despite complete failure of one of the two autonomous braking systems, it is possible without difficulty to dispense with any assistance from the driver of the vehicle, for example by way of an introduction of force by the driver into the at least one braking circuit 12. The braking circuit of FIG. 1 thus realizes an "autonomous fallback level" that allows continued executability of highly autonomous (highly automated) applications despite complete failure of one of the two autonomous braking systems. Fallback of the braking system to a mechanical fallback level can thus be avoided.

Merely by way of example, the braking system of FIG. 1 has a brake master cylinder 22 which is linked to the at least one braking circuit 12 and in which a pressure increase can be brought about by way of actuation, by a driver of the vehicle, of a brake actuation element (not depicted) linked to a brake master cylinder 22. By way of the pressure increase in brake master cylinder 22, the at least one first brake piston of the at least one electromechanical and/or electromagnetic wheel brake cylinder 14 can also be displaced "manually" by way of a driver braking force of the driver. The driver thus still has, even in the event of an electrical system failure, the capability of actively bringing about braking of his or her vehicle by way of his or her driver braking force. It is noted, however, that because of its (complete) functional redundancy, the braking system does not require a "driver interface." The "driver interface," or brake master cylinder 22, can therefore also easily be omitted.

Motorized brake pressure buildup apparatus 18 of the brake system embodied with brake master cylinder 22 is preferably an electromechanical brake booster (for instance, an iBooster, an eBooster, an electronic booster, an eBKV, an electronic brake booster) upstream from brake master cylinder 22. A motorized piston/cylinder apparatus (plunger apparatus, integrated power brake (IPB)) and/or at least one pump are preferred for embodying a motorized brake pressure buildup apparatus 18 of a braking system having no brake master cylinder. Devices that are inexpensive and already used in many ways can therefore be used as motorized brake pressure buildup apparatuses 18.

As an optional refinement, the braking system of FIG. 1 also has at least one control apparatus 24 and 26. The at least one control apparatus 24 and 26 is respectively embodied in such a way that the at least one control apparatus 24 and 26 is operable at least temporarily in an autonomous braking mode in which at least motorized brake pressure buildup apparatus 18, the at least one electromechanical and/or electromagnetic individual-wheel brake 20, and/or the respective electromechanical or electromagnetic actuator of the at least one electromechanical and/or electromagnetic wheel brake cylinder 14 can have control applied to them by way of the at least one control apparatus 24 and 26 in such a way that the vehicle is brakable or becomes braked autonomously by operation of motorized brake pressure buildup apparatus 18 and/or by operation of the at least one electromechanical and/or electromagnetic individual-wheel brake 20 and/or of the at least one electromechanical and/or electromagnetic actuator.

The at least one control apparatus 24 and 26 that is present in the autonomous braking mode can additionally be designed to autonomously brake the vehicle primarily by operation of the at least one electromechanical and/or electromagnetic individual-wheel brake 20 and/or of the at least one electromechanical and/or electromagnetic actuator of the at least one electromechanical and/or electromagnetic wheel brake cylinder 14 (i.e., by way of the "autonomous electromechanical and/or electromagnetic braking system"). The "autonomous electromechanical and/or electromagnetic braking system" is thus used as a "master braking system" or as a "primary braking system" in "a normal situation" for (individual-wheel) autonomous braking of the rotation of the respectively associated wheel 10 (if applicable, with modulation of the respectively applied braking torque). In this situation the at least one control apparatus 24 and 26 is designed to use motorized brake pressure buildup apparatus 18 (or the "autonomous hydraulic braking system") for (individual-wheel) autonomous braking of the vehicle (if applicable, with modulation of the respectively applied braking torque) only when a functional impairment of the at least one electromechanical and/or electromagnetic individual-wheel brake 20 and/or of the at least one electromechanical and/or electromagnetic actuator of the at least one electromechanical and/or electromagnetic wheel brake cylinder 14 is ascertained, and/or if a current maximally producible total braking performance of the at least one electromechanical and/or electromagnetic individual-wheel brake 20 and of the at least one electromechanical and/or electromagnetic actuator of the at least one electromechanical and/or electromagnetic wheel brake cylinder 14 is not sufficient for autonomous braking of the vehicle within a predefined travel distance and/or within a predefined time interval. The "autonomous hydraulic braking system" thus serves as a "slave" braking system or as a "secondary" braking system "in a fault situation" in order to circumvent the functional impairment of the "autonomous electromechanical and/or electromagnetic braking system" and/or "in an extreme situation" in order to assist the "autonomous electromechanical and/or electromagnetic braking system." A high level of redundancy thus exists even during autonomous braking (e.g., for automated or semiautomated driving).

In the embodiment of FIG. 1, the braking system encompasses a first control apparatus 24 and a second control apparatus 26 (constituting the at least one control apparatus 24 and 26). First control apparatus 24 serves as a "master control apparatus" for applying control to the at least one electromechanical and/or electromagnetic actuator of the at least one electromechanical and/or electromagnetic wheel brake cylinder 14, and if applicable to the at least one electromechanical and/or electromagnetic individual-wheel brake 20 (by way of at least one first control signal 24*a*), while motorized brake pressure buildup apparatus 18 is controllable or becomes controlled (by way of at least one second control signal 26*a*) by second control apparatus 26 used as a "slave control apparatus." Control of the braking system of FIG. 1 is thus also embodied redundantly by way of the two control apparatuses 24 and 26. The two control apparatuses 24 and 26 can communicate with one another, for example, via a communication device 28. It is noted, however, that equipping the braking system with second control apparatus 26 is optional. Alternatively, the braking system components of the braking system can also all be capable of being controlled by way of a single control apparatus 24.

Figure 2:
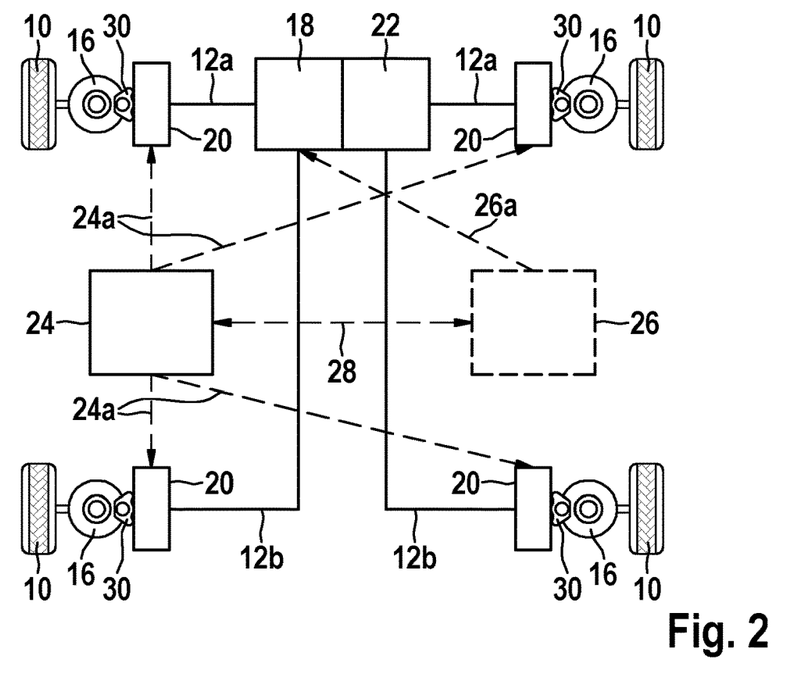
FIG. 2 schematically depicts an example embodiment of a further braking system according to the present invention.

FIG. 2 schematically depicts an embodiment of a further braking system according to the present invention.

The braking system schematically depicted in FIG. 2 differs from the embodiment explained above only in that the braking system encompasses two braking circuits 12*a* and 12*b*, at least one hydraulic wheel brake cylinder 30, which is respectively associated with a wheel 10 of the vehicle, being respectively linked to a respective sub-volume of the at least one hydraulic brake circuit 12*a* and 12*b*. The braking system furthermore has one respective electromechanical and/or electromagnetic individual-wheel brake 20 for each wheel of the vehicle. Optionally, in the braking system of FIG. 2 the number of hydraulic wheel brake cylinders 30 corresponds to the number of wheels 10 of the vehicle. In the embodiment of FIG. 2, a (non-zero) braking torque can therefore be exerted on each brake disk 16 of each wheel 10 of the vehicle by way of a brake piston of the associated hydraulic wheel brake cylinder 30, and a further (non-zero) braking torque can also be exerted by way of a brake piston of the associated electromechanical and/or electromagnetic individual-wheel brake 20. The braking system type reproduced in FIG. 2 is not designed, however, for a specific number of brake circuits 12*a* and 12*b*, or for a specific number of hydraulic wheel brake cylinders 30 equal to the number of wheels 10 of the vehicle.

The braking system of FIG. 2 also encompasses an "autonomous hydraulic braking system" (realized by way of the at least one hydraulic wheel brake cylinder 30 interacting with motorized brake pressure buildup apparatus 18) and an "autonomous electromechanical and/or electromagnetic braking system" (realized by way of the brake pistons, displaceable by way of their actuators, of the electromechanical and/or electromagnetic individual-wheel brakes 20). It therefore offers all the advantages of the embodiment explained above. With the braking system of FIG. 2 as well, for example, the "autonomous electromechanical and/or electromagnetic braking system" can be used "in a normal situation" as a "master braking system" or as a "primary braking system," while the "autonomous hydraulic braking system" is used, only "in a fault situation," as a "slave braking system" or "secondary braking system" to circumvent a functional impairment of the "autonomous electromechanical and/or electromagnetic braking system," and/or "in an extreme situation" to assist the "autonomous electromechanical and/or electromagnetic braking system." With regard to further features of the braking system of FIG. 2, reference is therefore made to the explanations above.

Each of the braking systems of FIGS. 1 and 2 can be referred to as a symbiogenetic hydraulic/electromechanical (and/or hydraulic/electromagnetic) braking system with (complete) functional redundancy. Each of these braking systems encompasses two independent autonomous braking systems (i.e., the "autonomous hydraulic braking system" and the "autonomous electromechanical and/or electromagnetic braking system"), each of the autonomous braking systems being suitable for autonomous execution of (individual-wheel) deceleration functions and (individual-wheel) stabilization functions. Utilization of the "autonomous electromechanical and/or electromagnetic braking system" as a "master braking system" or "primary braking system" for autonomous braking "in a normal situation" can be used to convert kinetic energy of the braked vehicle into electrical energy. As a result of the additional usability of the "autonomous hydraulic braking system" as a "slave braking system" or "secondary braking system" to assist the "autonomous electromechanical and/or electromagnetic braking system" "in an extreme situation," it is sufficient if the at least one electromechanical and/or electromagnetic wheel brake cylinder 14 and/or the at least one electromechanical and/or electromagnetic individual-wheel brake 20 is designed only for a maximum producible total braking performance below a target braking performance necessary for rapid and reliable braking of the vehicle "in an extreme situation." As will be explained in further detail below, even a relatively high target braking performance (or a significantly high total coefficient of friction) can be brought about by assisting the "autonomous electromechanical and/or electromagnetic braking system" by way of the "autonomous hydraulic braking system."

Figure 3:
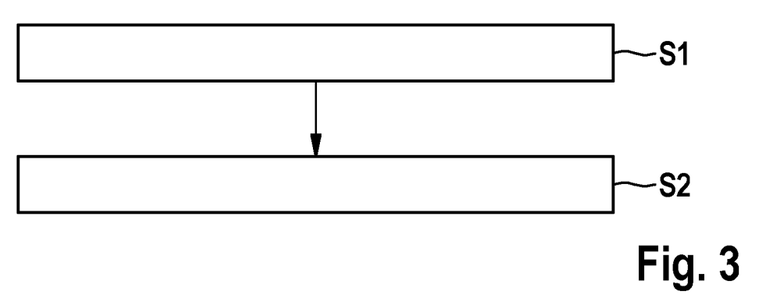
FIG. 3 is a flow chart to explain an example embodiment of the manufacturing method for an electromechanical or electromagnetic wheel brake cylinder.

FIG. 3 is a flow chart to explain an example embodiment of the manufacturing method for an electromechanical or electromagnetic wheel brake cylinder.

In a method step S1, a pressure chamber in the electromechanical or electromagnetic wheel brake cylinder, which is delimited by a displaceable first brake piston of the electromechanical or electromagnetic wheel brake cylinder, is embodied in such a way that the pressure chamber is linkable to a sub-volume of the at least one hydraulic braking circuit of the braking system, and the first brake piston is displaceable or becomes displaced by way of an increased pressure in at least the sub-volume. The pressure chamber and the first brake piston can be embodied, for instance, identically or similarly to a "pressure chamber" and a "displaceable brake piston" in a hydraulic wheel brake cylinder.

In addition, in a method step S2, an electromechanical or electromagnetic actuator is embodied in such a way that a second brake piston of the electromechanical or electromagnetic wheel brake cylinder is displaceable or becomes displaced by operation of the electromechanical or electromagnetic actuator. The electromechanical or electromagnetic actuator and the second brake piston can be embodied, for instance, identically or similarly to an "actuator" and a "displaceable brake piston" in an electromechanical and/or electromagnetic individual-wheel brake. Preferably, the pressure chamber, the first brake piston, the electromechanical or electromagnetic actuator, and the second brake piston are embodied in a shared housing of the electromechanical or electromagnetic wheel brake cylinder.

Method steps S1 and S2 can be executed in any sequence, overlappingly in time, and/or simultaneously.

Figure 4:
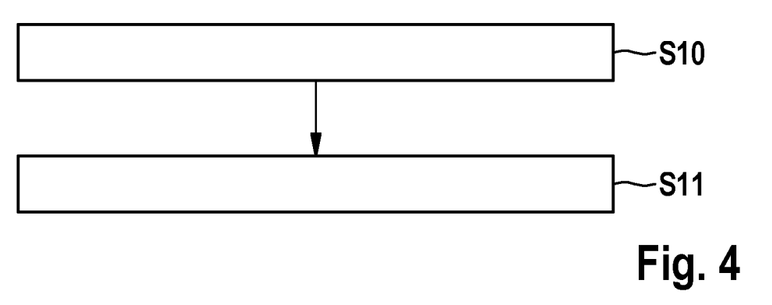
FIG. 4 is a flow chart to explain an example embodiment of a method according to the present invention for autonomous braking of a vehicle.

FIG. 4 is a flow chart to explain an example embodiment of a method according to the present invention for autonomous braking of a vehicle.

The braking system of FIG. 1 can be used, for example, to execute the method described here. An implementability of the method is not limited, however, either to that braking system type or to a specific vehicle type or motor vehicle type of the vehicle or motor vehicle.

Each of the two method steps S10 and S11 below is executed at least at times for autonomous braking of the vehicle:

As method step S10, a motorized brake pressure buildup apparatus, linked to at least one hydraulic braking circuit, of a braking system of the vehicle is operated in such a way that at least a pressure respectively present in at least one sub-volume of the at least one hydraulic braking circuit becomes increased, at least one of the above-described electromechanical or electromagnetic wheel brake cylinders, which is associated respectively with a wheel of the vehicle, being linked to the at least one sub-volume of the at least one hydraulic braking circuit in such a way that the vehicle becomes autonomously braked at least in part by operation of the motorized brake pressure buildup apparatus.

As method step S11, at least one electromechanical and/or electromagnetic individual-wheel brake and/or the respective electromechanical or electromagnetic actuator of the at least one electromechanical and/or electromagnetic wheel brake cylinder is operated, for each wheel of the vehicle, in such a way that the vehicle becomes autonomously braked at least in part by operation of the at least one electromechanical and/or electromagnetic individual-wheel brake and/or of the at least one electromechanical and/or electromagnetic actuator.

Thus only method step S10, only method step S11, or both method steps S10 and S11 simultaneously, can be executed for autonomous braking of the vehicle or motor vehicle.

Figure 5:
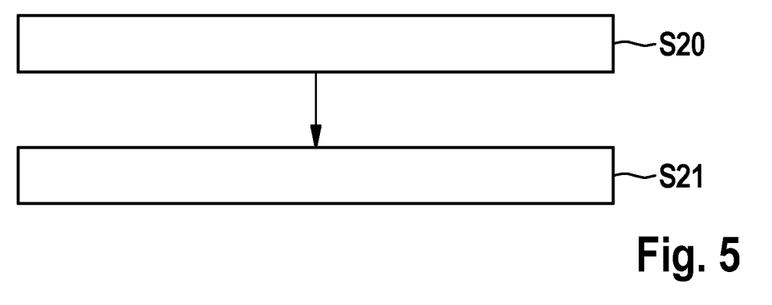
FIG. 5 is a flow chart to explain an example embodiment of a further method according to the present invention for autonomous braking of a vehicle.

FIG. 5 is a flow chart to explain an embodiment of a further method according to the present invention for autonomous braking of a vehicle.

The braking system of FIG. 2 can be used, for example, to execute the method described here. An implementability of the method is not limited, however, either to that braking system type or to a specific vehicle type or motor vehicle type of the vehicle or motor vehicle.

Each of the two method steps S20 and S21 below is executed at least at times for autonomous braking of the vehicle:

As method step S20, a motorized brake pressure buildup apparatus, linked to at least one hydraulic braking circuit, of a braking system of the vehicle is operated in such a way that at least a pressure respectively present in at least one sub-volume of the at least one hydraulic braking circuit becomes increased, at least one hydraulic brake cylinder, which is associated respectively with a wheel of the vehicle, being linked to the at least one sub-volume of the at least one hydraulic braking circuit in such a way that the vehicle becomes autonomously braked at least in part by operation of the motorized brake pressure buildup apparatus.

In addition, as method step S21, at least one electromechanical and/or electromagnetic individual-wheel brake is operated, for each wheel of the vehicle, in such a way that the vehicle becomes autonomously braked at least in part by operation of the at least one electromechanical and/or electromagnetic individual-wheel brake.

Thus only method step S20, only method step S21, or both method steps S20 and S21 simultaneously, can be executed for autonomous braking of the vehicle or motor vehicle.

Figure 6:
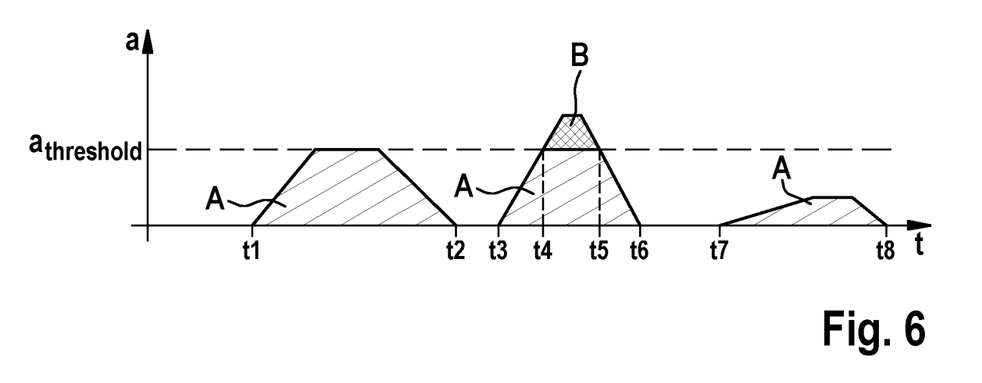
FIG. 6 shows a coordinate system for explaining a refinement of the example methods shown schematically in FIG. 4 and FIG. 5.

FIG. 6 shows a coordinate system to explain a refinement of the methods schematically reproduced in FIG. 4 and FIG. 5. In the coordinate system of FIG. 6, an abscissa is a time axis t while an ordinate indicates a vehicle deceleration a.

In the refinement described here of the method schematically reproduced in FIG. 4 and FIG. 5, the vehicle is autonomously braked primarily by operation of the at least one electromechanical and/or electromagnetic individual-wheel brake and/or of the at least one electromechanical and/or electromagnetic actuator (i.e., by execution of method step S11 or S21). This is indicated by way of cross-hatching A between times t1 and t2, t3 and t4, t5 and t6, and t7 and t8. Preferably, the at least one electromechanical and/or electromagnetic individual-wheel brake and/or the at least one electromechanical and/or electromagnetic actuator can additionally be used to convert kinetic energy of the vehicle being braked into electrical energy.

If, however, for instance between times t3 and t4, a currently maximally producible total braking performance of the at least one electromechanical and/or electromagnetic individual-wheel brake and of the at least one electromechanical and/or electromagnetic actuator is not sufficient for autonomous braking of the vehicle within a predefined travel distance and/or within a predefined time interval, the motorized brake pressure buildup apparatus is then also used (by additional execution of method step S10 or S11) for autonomous braking of the vehicle (cross-hatching B). If, for instance, a vehicle deceleration a exceeding a vehicle deceleration $a_{threshold}$ maximally producible by way of execution only of method step S11 or S12 is at least briefly necessary for autonomous braking of the vehicle within the predefined travel distance and/or within the predefined time interval, the motorized brake pressure buildup apparatus can then be used to circumvent the "extreme situation." The maximum vehicle deceleration $a_{threshold}$ producible by way of execution only of method step S11 or S21 can thus be less than a vehicle deceleration a to be produced in an "extreme situation." Inexpensive and space-saving devices can thus be used for the at least one electromechanical and/or electromagnetic individual-wheel brake and/or for the at least one electromechanical and/or electromagnetic actuator.

The motorized brake pressure buildup apparatus can also be used for autonomous braking of the vehicle if a functional impairment of the at least one electromechanical and/or electromagnetic individual-wheel brake and/or of the at least one electromechanical and/or electromagnetic actuator has been ascertained.

What is claimed is:

1. An electromechanical or electromagnetic wheel brake cylinder for a braking system, including at least one hydraulic braking circuit, of a vehicle, comprising:
a pressure chamber that is situated in the electromechanical or electromagnetic wheel brake cylinder and is delimited by a displaceable first brake piston of the electromechanical or electromagnetic wheel brake cylinder, and the pressure chamber being linkable to a respective sub-volume of the at least one hydraulic braking circuit of the braking system in such a way that the first brake piston is displaceable by way of a pressure that is increased at least in the respective sub-volume;
an electromechanical or electromagnetic actuator; and
a second brake piston of the electromechanical or electromagnetic wheel brake cylinder which is displaceable by operation of the electromechanical or electromagnetic actuator.

2. A braking system for a vehicle, comprising:
at least one hydraulic braking circuit;
at least one electromechanical or electromagnetic wheel brake cylinder, which is respectively associated with a wheel of the vehicle and is respectively linked to a respective sub-volume of the at least one hydraulic braking circuit, each of the at least one electromechanical or electromagnetic wheel brake cylinder including:
a pressure chamber that is situated in the electromechanical or electromagnetic wheel brake cylinder and is delimited by a displaceable first brake piston of the electromechanical or electromagnetic wheel brake cylinder, and the pressure chamber being linkable to the respective sub-volume of the at least one hydraulic braking circuit of the braking system in such a way that the first brake piston is displaceable by way of a pressure that is increased at least in the respective sub-volume,
an electromechanical or electromagnetic actuator, and
a second brake piston of the electromechanical or electromagnetic wheel brake cylinder which is displaceable by operation of the electromechanical or electromagnetic actuator; and
a motorized brake pressure buildup apparatus configured in such a way that by operation of the motorized brake pressure buildup apparatus, at least one pressure respectively present in the at least one sub-volume of the at least one hydraulic braking circuit is increasable;
wherein the braking system has, for each wheel of the vehicle, a respective electromechanical and/or electromagnetic individual-wheel brake or the at least one electromechanical and/or electromagnetic wheel brake cylinder.

3. A braking system for a vehicle, comprising:
at least one hydraulic braking circuit;
at least one hydraulic wheel brake cylinder, which is respectively associated with a wheel of the vehicle and is respectively linked to a respective sub-volume of the at least one hydraulic braking circuit;
a motorized brake pressure buildup apparatus configured in such a way that by operation of the motorized brake pressure buildup apparatus, at least one pressure respectively present in the at least one sub-volume of the at least one hydraulic braking circuit is increasable; and
at least one further motorized apparatus;
wherein the braking system has one respective electromechanical and/or electromagnetic individual-wheel brake for each wheel of the vehicle, constituting the at least one further motorized apparatus.

4. The braking system as recited in claim 2, further comprising:
at least one control apparatus that is respectively configured in such a way that the at least one control apparatus is operable at least temporarily in an autonomous braking mode in which at least the motorized brake pressure buildup apparatus, and/or the at least one electromechanical and/or electromagnetic individual-wheel brake, and/or the respective electromechanical or electromagnetic actuator of the at least one electromechanical and/or electromagnetic wheel brake cylinder can have control applied to them, by way of the at least one control apparatus, in such a way that the vehicle is autonomously breakable: (i) by operation of the motorized brake pressure buildup apparatus, and/or (ii) by operation of the at least one electromechanical and/or electromagnetic individual-wheel brake, and/or (iii) by operation of the at least one electromechanical or electromagnetic actuator.

5. The braking system as recited in claim 3, further comprising:
at least one control apparatus that is respectively configured in such a way that the at least one control apparatus is operable at least temporarily in an autonomous braking mode in which at least the motorized brake pressure buildup apparatus, and/or the at least one electromechanical and/or electromagnetic individual-wheel brake, can have control applied to them, by way of the at least one control apparatus, in such a way that the vehicle is autonomously breakable: (i) by operation of the motorized brake pressure buildup apparatus, and/or (ii) by operation of the at least one electromechanical and/or individual-wheel brake.

6. The braking system as recited in claim 4, wherein the at least one control apparatus in the autonomous braking mode is configured to autonomously brake the vehicle primarily by operation of the at least one electromechanical and/or electromagnetic individual-wheel brake and/or of the at least one electromechanical and/or electromagnetic actuator, and to utilize the motorized brake pressure buildup apparatus for autonomous braking of the vehicle only when: (i) a functional impairment of the at least one electromechanical and/or electromagnetic individual-wheel brake and/or of the at least one electromechanical and/or electromagnetic actuator is ascertained, and/or (ii) a currently maximally producible total braking performance of the at least one electromechanical and/or electromagnetic individual-wheel brake and of the at least one electromechanical and/or electromagnetic actuator is not sufficient for autonomous braking of the vehicle within a predefined travel distance and/or within a predefined time interval.

7. The braking system as recited claim 2, further comprising:
a brake master cylinder which is linked to the at least one braking circuit and in which a pressure increase is producible by actuation, by a driver of the vehicle, of a brake actuation element linked to the brake master cylinder;
wherein the motorized brake pressure buildup apparatus is an electromechanical brake booster preceding the brake master cylinder.

8. A manufacturing method for an electromechanical or electromagnetic wheel brake cylinder for a braking system including at least one hydraulic braking circuit, of a vehicle, the method comprising the following steps:
embodying a pressure chamber in the electromechanical or electromagnetic wheel brake cylinder, which is delimited by a displaceable first brake piston of the electromechanical or electromagnetic wheel brake cylinder, in such a way that the pressure chamber is linkable to a sub-volume of the at least one hydraulic braking circuit of the braking system, and the first brake piston is displaceable by way of an increased pressure in at least the sub-volume; and
embodying an electromechanical or electromagnetic actuator in such a way that a second brake piston of the electromechanical or electromagnetic wheel brake cylinder is displaceable by operation of the electromechanical or electromagnetic actuator.

9. A method for autonomous braking of a vehicle, the method comprising:
executing, at least at times for autonomous braking of the vehicle, the following steps:
operating a motorized brake pressure buildup apparatus, linked to at least one hydraulic braking circuit of a braking system of the vehicle, in such a way that at least a pressure respectively present in at least one sub-volume of the at least one hydraulic braking circuit becomes increased, at least one electromechanical or electromagnetic wheel brake cylinder, which is associated respectively with a wheel of the vehicle, being linked to the at least one sub-volume of the at least one hydraulic braking circuit in such a way that the vehicle becomes autonomously braked at least in part by operation of the motorized brake pressure buildup apparatus; and/or
operating at least one electromechanical and/or electromagnetic individual-wheel brake and/or a respective electromechanical or electromagnetic actuator of the at least one electromechanical and/or electromagnetic wheel brake cylinder, for each wheel of the vehicle, in such a way that the vehicle becomes autonomously braked at least in part by operation of the at least one electromechanical and/or electromagnetic individual-wheel brake and/or of the at least one electromechanical and/or electromagnetic actuator.

10. A method for autonomous braking of a vehicle, the method comprising:
executing, at least at times for autonomous braking of the vehicle, the following steps:
operating a motorized brake pressure buildup apparatus, linked to at least one hydraulic braking circuit of a braking system of the vehicle, in such a way that at least a pressure respectively present in at least one sub-volume of the at least one hydraulic braking circuit becomes increased, at least one hydraulic brake cylinder, which is associated respectively with a wheel of the vehicle, being linked to the at least one sub-volume of the at least one hydraulic braking circuit in such a way that the vehicle becomes autonomously braked at least in part by operation of the motorized brake pressure buildup apparatus; and/or
operating at least one electromechanical and/or electromagnetic individual-wheel brake, for each wheel of the vehicle, in such a way that the vehicle becomes autonomously braked at least in part by operation of the at least one electromechanical and/or electromagnetic individual-wheel brake.

11. The method as recited in claim 9, wherein the vehicle is autonomously braked primarily by operation of the at least one electromechanical and/or electromagnetic individual-wheel brake and/or of the at least one electromechanical and/or electromagnetic actuator, and the motorized brake pressure buildup apparatus is used for autonomous braking of the vehicle only when: (i) a functional impairment of the at least one electromechanical and/or electromagnetic individual-wheel brake and/or of the at least one electromechanical and/or electromagnetic actuator is ascertained, and/or (ii) a currently maximally producible total braking performance of the at least one electromechanical and/or electromagnetic individual-wheel brake and of the at least one electromechanical and/or electromagnetic actuator is not sufficient for autonomous braking of the vehicle within a predefined travel distance and/or within a predefined time interval.

* * * * *

UNITED STATES PATENT AND TRADEMARK OFFICE
CERTIFICATE OF CORRECTION

| | |
|---|---|
| PATENT NO. | : 11,872,966 B2 |
| APPLICATION NO. | : 17/047850 |
| DATED | : January 16, 2024 |
| INVENTOR(S) | : Thomas Schmidt et al. |

It is certified that error appears in the above-identified patent and that said Letters Patent is hereby corrected as shown below:

On the Title Page

Correct Item (73) Assignee:
"ROBE IT BOSCH GMBH, Stuttgart (DE)"
With:
-- ROBERT BOSCH GMBH, Stuttgart (DE) --

Signed and Sealed this
Twenty-seventh Day of February, 2024

Katherine Kelly Vidal
*Director of the United States Patent and Trademark Office*